(12) United States Patent
O'Neil et al.

(10) Patent No.: US 9,010,094 B2
(45) Date of Patent: Apr. 21, 2015

(54) ENGINE CONTROL SYSTEM AND METHOD FOR INITIATING A DIESEL PARTICULATE FILTER REGENERATION

(71) Applicant: Caterpillar Inc., Peoria, IL (US)

(72) Inventors: Kevin A. O'Neil, Raleigh, NC (US); Arick M. Bakken, Raleigh, NC (US); Andrew P. Bachle, Cary, NC (US); John E. Preble, Jr., Fuquay Varina, NC (US)

(73) Assignee: Caterpillar Inc., Peoria, IL (US)

( * ) Notice: Subject to any disclaimer, the term of this patent is extended or adjusted under 35 U.S.C. 154(b) by 153 days.

(21) Appl. No.: 13/753,059

(22) Filed: Jan. 29, 2013

(65) Prior Publication Data

US 2013/0227933 A1 Sep. 5, 2013

Related U.S. Application Data

(60) Provisional application No. 61/606,928, filed on Mar. 5, 2012.

(51) Int. Cl.
| | |
|---|---|
| *F01N 3/00* | (2006.01) |
| *F01N 3/023* | (2006.01) |
| *F02D 41/02* | (2006.01) |
| *F02D 41/08* | (2006.01) |
| *F02D 41/00* | (2006.01) |
| *F02D 41/14* | (2006.01) |

(52) U.S. Cl.
CPC .............. *F01N 3/023* (2013.01); *F02D 41/029* (2013.01); *F02D 41/08* (2013.01); *F02D 41/1466* (2013.01); *F02D 41/0002* (2013.01); *Y02T 10/42* (2013.01)

(58) Field of Classification Search
CPC ...... F01N 3/0842; F01N 3/2066; F01N 3/035; F01N 13/02; F01N 2610/02; F01N 2610/03; F01N 9/002; F02D 41/0275; F02D 41/1441; F02D 41/0295; F02D 41/029
USPC ............ 60/273, 274, 285, 286, 295, 297, 311
See application file for complete search history.

(56) References Cited

U.S. PATENT DOCUMENTS

| | | | | |
|---|---|---|---|---|
| 5,884,210 | A * | 3/1999 | Rettig et al. ................... | 701/115 |
| 7,406,822 | B2 * | 8/2008 | Funke et al. ..................... | 60/297 |
| 2008/0163610 | A1 * | 7/2008 | Baird et al. ..................... | 60/295 |
| 2009/0288398 | A1 * | 11/2009 | Perfetto et al. .................. | 60/287 |

(Continued)

FOREIGN PATENT DOCUMENTS

| | | |
|---|---|---|
| EP | 2333284 | 6/2011 |
| JP | 2011069324 A | 4/2011 |
| WO | 2009143258 | 11/2009 |

*Primary Examiner* — Jason Shanske
*Assistant Examiner* — Patrick Maines
(74) *Attorney, Agent, or Firm* — Miller, Matthias & Hull LLP

(57) ABSTRACT

An engine command override may occur when a diesel particulate filter (DPF) requires regeneration. The need for regeneration may be indicated by regeneration level. The engine may be operated in a normal mode when the DPF regeneration level is below a regeneration level threshold, wherein the engine command is based on the throttle input. Additionally, the engine may be operated in an override mode when the DPF regeneration level is above a regeneration level threshold and the engine is operating in the idle state, wherein the engine command is based on a predetermined throttle regeneration setting.

17 Claims, 11 Drawing Sheets

(56) References Cited

U.S. PATENT DOCUMENTS

| | | |
|---|---|---|
| 2010/0229538 A1* | 9/2010 | Bloms et al. .................... 60/295 |
| 2010/0275580 A1 | 11/2010 | Abraham et al. |
| 2010/0313551 A1 | 12/2010 | Johnson et al. |
| 2011/0088371 A1* | 4/2011 | Berke et al. ..................... 60/274 |
| 2011/0107741 A1 | 5/2011 | Larose et al. |
| 2011/0209463 A1 | 9/2011 | Tan et al. |
| 2012/0227378 A1* | 9/2012 | Koestler .......................... 60/274 |
| 2012/0227379 A1* | 9/2012 | Koestler .......................... 60/274 |

* cited by examiner

| Regen Level | Description | Idle Check Met | Throttle Input | Engine Derate | DPF Lamp | Engine Lamp | Operator Alert | Warning Level | Action response |
|---|---|---|---|---|---|---|---|---|---|
| 0 | Passive Regen | Yes or No | Any | Off | Off | Off | Off | 0 | Normal Operation |
| 1 | Start Active Regen | Yes | <60% | Off | Off | Off | Off | 0 | Auto Ramp to 60% Throttle After Time Delay |
|  |  | No | Any | Off | Off | Off | Off | 0 | Normal Operation |
| 2 | Active Regen | Yes | <60% | Off | Off | Off | Off | 0 | Auto Ramp to 60% Throttle After Time Delay |
|  |  | No | <60% | Off | Amber | Off | Off | 1 | Normal Operation; DPF Lamp On |
|  |  | No | >60% | Off | Off | Off | Off | 0 | Normal Operation |
| 3 | Parked Regen | Yes | Any | Off | Amber | Amber | Amber | 2 | Auto Ramp to 0% After Time Delay; Send Operator Alert |
|  |  | No |  | On |  |  |  |  | Derate Engine; Send Operator Alert; |
| 4 | Service Tool Regen | Yes or No | Any | On | Amber | Red | Flashing/Alarm | 3 | Derate Engine; Send Operator Alert; Manual Regen Required |
| 5 | Critical Issue | Yes or No | Any | On | Amber | Red | Flashing/Alarm | 3 | Derate Engine |

FIG. 10

| Regen Level | Description | Idle Check Met | Desired Engine Speed | Engine Derate | DPF Lamp | Engine Lamp | Operator Alert | Warning Level | Action response |
|---|---|---|---|---|---|---|---|---|---|
| 0 | Passive Regen | Yes or No | Any | Off | Off | Off | Off | 0 | Normal Operation |
| 1 | Start Active Regen | No | >1600 | Off | Off | Off | Off |  | Normal Operation |
|  |  | Yes | >1600 | Off | Off | Off | Off |  | Normal Operation |
|  |  | No | <1600 | Off | Off | Off | Off | 0 | Normal Operation |
|  |  | Yes | <1600 | Off | Off | Off | Off |  | Auto Ramp to 2300 RPM After Time Delay |
| 2 | Active Regen | No | >1600 | Off | Off | Off | Off | 0 | Normal Operation |
|  |  | Yes | >1600 | Off | Off | Off | Off | 0 | Normal Operation |
|  |  | No | <1600 | Off | Off | Off | Off | 1 | Illuminate DPF Lamp After Time Delay |
|  |  | Yes | <1600 | Off | Off | Off | Off | 0 | Auto Ramp to 2300 RPM After Time Delay |
| 3 | Parked Regen | No | Any | On | Amber | Amber | Flashing |  | Normal Operation |
|  |  | Yes | Any | On | Amber | Amber | Flashing | 2 | Auto Ramp to Low Idle After Time Delay; Send forced Regen Message |
| 4 | Service Tool Regen | Yes or No | Any | On | Amber | Amber | Flashing/Alarm | 3 | Derate Engine; Send Operator Alert; Manual Regen Required |
| 5 | Critical Issue | Yes or No | Any | On | Amber | Amber | Flashing/Alarm | 3 | Derate Engine |

FIG. 11

ENGINE CONTROL SYSTEM AND METHOD FOR INITIATING A DIESEL PARTICULATE FILTER REGENERATION

CROSS-REFERENCE TO RELATED APPLICATION

This application claims the benefit of U.S. Provisional Application Ser. No. 61/606,928, filed on Mar. 5, 2012.

TECHNICAL FIELD

The present disclosure relates to engine controls and methods and, more particularly, to methods and controls for operating an engine to initiate a diesel particulate filter regeneration.

BACKGROUND

One of the byproducts of fuel combustion in an internal combustion engine is carbon particles, which are typically referred to as soot. Emission standards will typically specify a limit to the amount of soot that an engine can emit to the environment, which limit will be below the level of soot generated by the engine during operation. Therefore, various components and systems are employed by engine or vehicle manufacturers that control and limit the amount of soot emitted to the environment.

One device commonly used to limit the amount of soot expelled into the environment from an engine is referred to as a particulate trap. Such a device includes a porous substrate, for example, made of ceramic material, which may be coated with various chemical compounds that alter the composition of exhaust constituents. The porosity of the substrate acts as a filter for physically trapping carbon particles or soot in an exhaust stream passing over and/or through the filter. One can appreciate that such physical removal of carbon particles from a gas stream will progressively saturate the filter with particulate matter.

One method of restoring the performance of a particulate trap becoming saturated with soot is by a process called regeneration. Regeneration involves the oxidation or burning of accumulated particulate matter in a filter. Such oxidation may include the introduction of a combustible agent, such as fuel, onto the particulate matter to aid in the combustion. Moreover, regeneration of particulate traps often includes an elevation of the temperature of the particulate matter, for example, by elevating the temperature of the exhaust gas stream passing therethrough, prior to combustion.

Conventional regeneration controls and methods typically require the operator to manually initiate the regeneration mode. These known systems may provide an indicator or rely on operator knowledge to determine when the filter trap requires regeneration. Such manual controls, however, may be overly cumbersome to use, may require the operator to actively initiate the regeneration process, and may be implemented incorrectly by less experienced operators.

SUMMARY OF THE DISCLOSURE

In accordance with one aspect of the disclosure, a method is provided of automatically controlling an engine to override a throttle input setting and operate at a predetermined throttle regeneration setting sufficient to initiate a regeneration event for a diesel particulate filter associated with a machine and operably coupled to the engine, the engine including a controller configured to generate an engine command setting. The method may include determining a DPF regeneration level indicative of a need to regenerate the diesel particulate filter and determining whether the engine is in an idle state. The method may further include operating the engine in a normal mode when the DPF regeneration level is below a regeneration level threshold, wherein the engine command setting in the normal mode is based on a throttle input setting. Additionally, the method may include operating the engine in an override mode when the DPF regeneration level is above a regeneration level threshold and the engine is operating in the idle state, wherein the engine command setting in the override mode is based on the predetermined throttle regeneration setting.

In another aspect of the disclosure that may be combined with any of these aspects, a machine is provided that may include an engine having an exhaust manifold, a diesel particulate filter fluidly connected with the exhaust manifold, the diesel particulate filter having a regeneration level indicative of a need for regeneration, a DPF sensor configured to determine the DPF regeneration level, and a throttle input device configured to generate a throttle input setting. The machine may further include a controller operably coupled to the engine, the DPF sensor, and the throttle input device, and configured to determine an engine command setting, receive the DPF regeneration level, receive the throttle input setting, determine whether the engine is in an idle state, operate the engine in a normal mode when the DPF regeneration level is below a regeneration level threshold, wherein the engine command setting in the normal mode is based on a throttle input setting, and operate the engine in an override mode when the DPF regeneration level is above a regeneration level threshold and the engine is operating in the idle state, wherein the engine command setting in the override mode is based on a predetermined throttle regeneration setting.

BRIEF DESCRIPTION OF THE DRAWINGS

FIG. 10 is a chart summarizing inputs, outputs, and related actions for a series of regeneration levels that may be used with a first machine.

FIG. 11 is a chart summarizing inputs, outputs, and related actions for a series of regeneration levels that may be used with a second, alternative machine.

DETAILED DESCRIPTION

Figure 1:
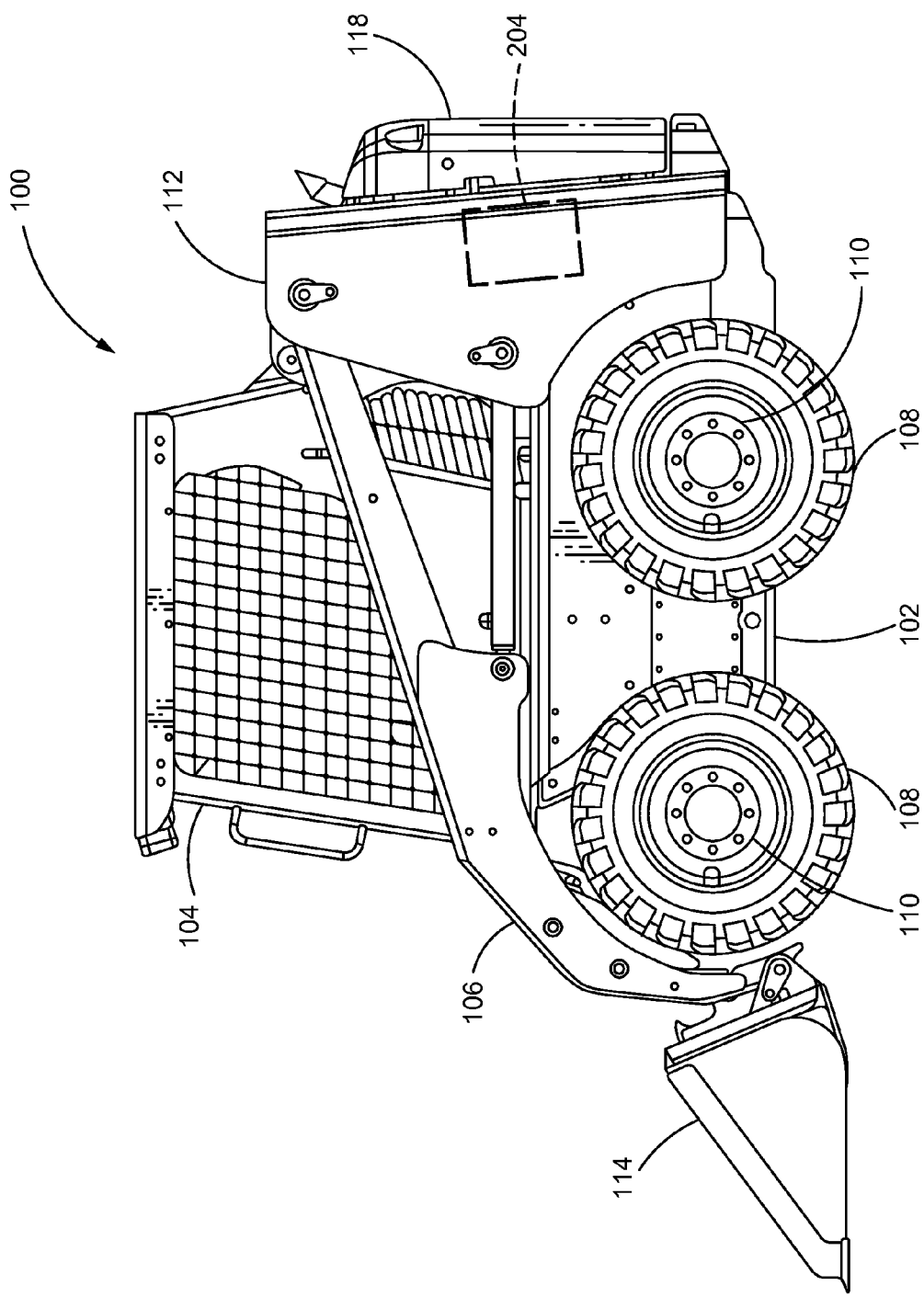
FIG. 1 is a schematic view of a machine in accordance with the disclosure.

A side view of a machine, in this example a skid steer loader 100, is shown in FIG. 1. The term "machine" is used generically to describe any machine having at least one ground engaging member that is driven, for example, by use of electrical or hydrostatic power, by a gear system or transmission interconnecting the ground engaging member with an engine, or any other known drive arrangement. For instance, an alternative embodiment for the machine may include a generator or another device capable of producing an alternative form of energy, such as electrical power.

The skid steer loader 100 shown in FIG. 1 generally includes a body portion 102, an operator compartment 104, and a lift arm assembly 106. Front and rear sets of wheels 108 are mounted to stub axles 110 which extend from each side of the body portion 102. The lift arm assembly 106 is pivotally mounted to laterally spaced side members or uprights 112 at the rear of the body portion 102 and pivotally carries a bucket or other implement 114 at the forward end thereof. The skid steer loader 100 could be belt/track driven or could have a belt entrained around the front and rear wheels 108.

An engine 204 is housed in an engine compartment 118 at a rear of the skid steer loader 100. The engine provides the power necessary to propel the skid steer loader 100 as well as to operate the various actuators and systems of the skid steer loader 100. As can be appreciated, other machines may have different configurations and/or various other implements associated therewith. The term "machine" as used herein may refer to any machine that performs some type of operation associated with an industry such as mining, construction, farming, transportation, or any other industry known in the art. For example, a machine may be an earth-moving machine, such as a wheel loader, excavator, dump truck, backhoe, motor grader, material handler or the like. Any implements may be utilized and employed for a variety of tasks, including, for example, loading, compacting, lifting, brushing, and include, for example, buckets, compactors, forked lifting devices, brushes, grapples, cutters, shears, blades, breakers/hammers, augers, drills, and others.

Figure 2:
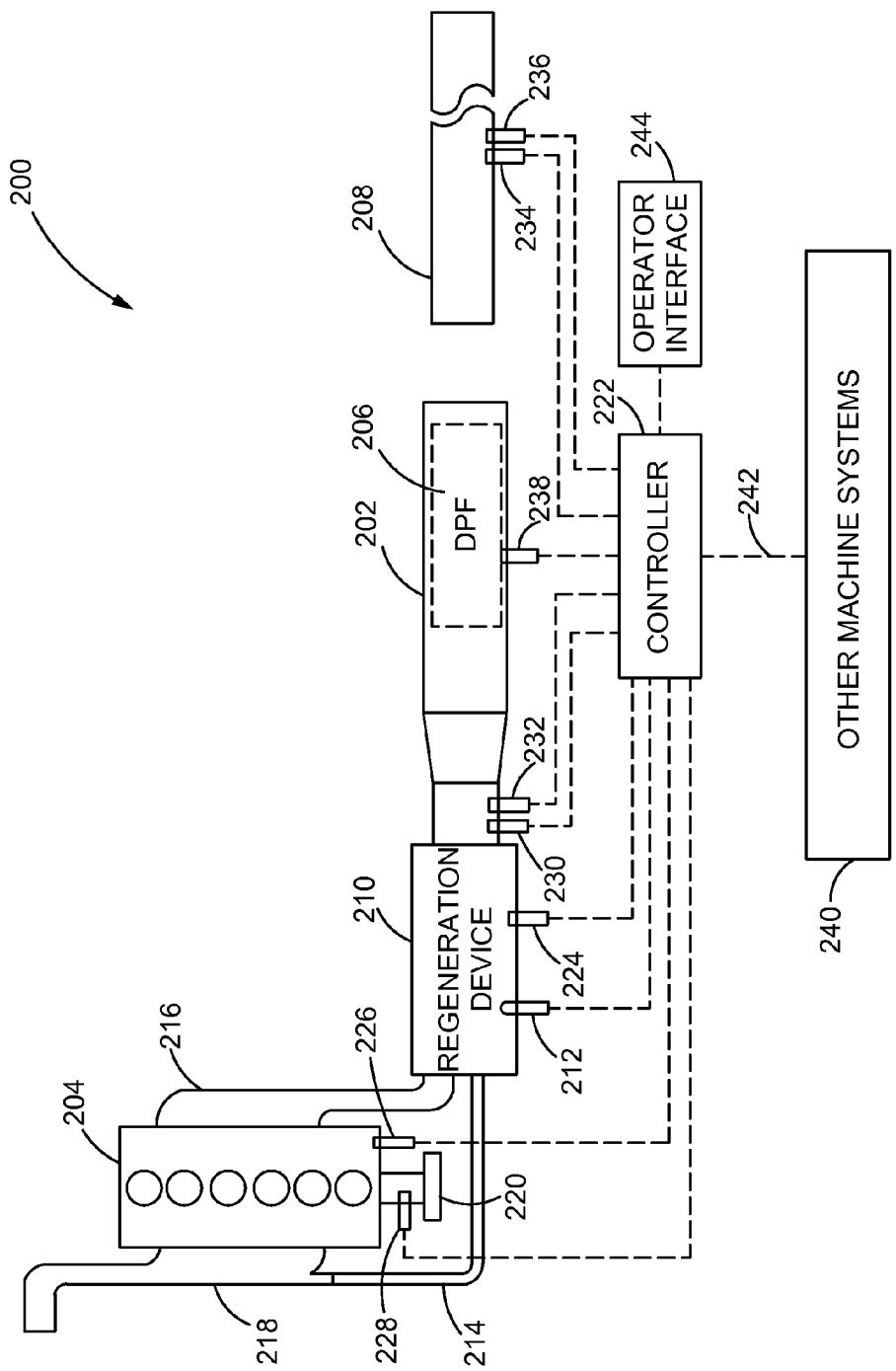
FIG. 2 is a block diagram of an engine having an aftertreatment system provided on the machine of FIG. 1.

A block diagram of an after-treatment system 200 that may be associated with the machine is shown in FIG. 2. The after-treatment system 200 includes an after-treatment device 202 disposed to receive a flow of exhaust gas from the engine 204. The after-treatment device 202 may include one or more internal devices operating to chemically or physically treat a flow of exhaust gas passing therethrough. Examples of such devices include oxidation catalysts, particulate filters, adsorbing filters, and others. Relevant to the present disclosure, the after-treatment device 202 essentially includes a diesel particulate filter (DPF) 206, which is shown in dashed line and which may be included as part of the after-treatment device 202 or may be disposed as a stand-alone part in fluid communication with an exhaust pipe or conduit of an engine.

The illustration of FIG. 2 will now be described in more detail. Such illustration is exemplary and represents one potential embodiment of an after-treatment system associated with an engine that is installed in a vehicle or machine. The after-treatment system 200 includes an exhaust conduit or exhaust pipe 208 that is fluidly connected to the after-treatment device 202 and DPF 206. Exhaust gas passing through the after-treatment device 202 and the DPF 206 flows through the exhaust pipe 208.

In the embodiment shown in FIG. 2, the after-treatment device 202 is fluidly connected to a regeneration device 210. The regeneration device 210 may be any device operating to initiate, maintain, and/or control the rate of a regeneration event occurring in the DPF 206 during operation of the engine 204. The illustrated regeneration device 210 includes an injector 212 disposed to inject a fuel, such as diesel, or a catalyst. When fuel is injected, a flow of fresh, compressed air is supplied via a conduit 214 to mix with the fuel and, in the presence of a spark, create the flame that introduces heat to the flow of exhaust gas and/or the DPF 206. Such heat helps oxidize carbon and other deposits found on the DPF 206 during a regeneration event, which may produce byproducts, such as ash, that can be collected and/or removed from the DPF 206 during service.

In the illustrated embodiment, the after-treatment device 202 is fluidly connected to an exhaust manifold 216 of the engine 204. The engine 204 operates to combine fuel and air supplied to a plurality of cylinders via an intake manifold 218 to produce power or torque at an output shaft 220. In a known configuration, each of the cylinders of the engine 204 includes a piston connected to a rotating crankshaft (not shown) via linkages (not shown). The reciprocating motion of the pistons generates a rotational motion of the crankshaft. Such rotational motion may be transferred to various components and systems of a machine, such as hydrostatic pumps, mechanical and/or hydraulic transmissions, electrical generators, work implements, and so forth. In the illustration of FIG. 2, the output shaft 220 generically represents a mechanical linkage that can transfer torque and power generated by the engine 204 during operation to any such components and systems of the machine.

The after-treatment system 200 may further include a controller 222. The controller 222 may be a single controller or may include more than one controller disposed to control various functions and/or features of a machine. For example, a master controller, used to control the overall operation and function of the machine, may be cooperatively implemented with a motor or engine controller, used to control the engine 204. The term "controller" broadly encompasses one, two, or more controllers that may be associated with the machine and that may cooperate in controlling various functions and operations of the machine including control of a regeneration device or regeneration processes. The functionality of the controller, while shown conceptually in the figures that follow to include various discrete functions for illustrative purposes only, may be implemented in hardware and/or software without regard to the discrete functionality shown. Accordingly, various interfaces of the controller are described relative to components of the after-treatment system 200 shown in the block diagram of FIG. 2. Such interfaces are not intended to limit the type and number of components that are connected, nor the number of controllers that are described. The interconnections between the controller 222 and the various sensors and actuators are denoted in dashed line, which represent communication lines for transferring information signals and commands to and from the controller 222. As can be appreciated, any appropriate type of connection may be used, for example, electrical conductors carrying analog or digital electrical signals, and/or electronic communication channels such as those found in controller area network (CAN) arrangements.

The controller 222 is connected to various sensors and actuators that are disposed to measure various parameters during operation of the after-treatment system 200. The controller 222 is thus disposed to receive information indicative of such operational parameters, to process such information, and to use such information to operate the after-treatment system 200 effectively and efficiently. As illustrated in the embodiment of FIG. 2, the controller 222 may be connected to the injector 212 and to a flame or temperature sensor 224 associated with the regeneration device 210. The controller 222 further may be connected to an engine speed sensor 226 and to an optional load sensor 228 disposed to measure a load being present at the output shaft 220.

The controller 222 also may communicate with an upstream temperature sensor 230 and an upstream pressure sensor 232. The upstream sensors 230 and 232 are disposed to provide signals to the controller 222 that are indicative of, respectively, the temperature and pressure of the exhaust gas flow before such flow enters or passes through the after-treatment device 202 and, in this case, before it passes through the DPF 206. The controller 222 may further communicate with a downstream temperature sensor 234 and a downstream pressure sensor 236. The downstream sensors 234 and 236 provide signals to the controller 222 that are indicative of, respectively, the temperature and pressure of the exhaust flow exiting the DPF 206. Even though separate sensors are shown disposed upstream and downstream of the DPF 206, for example, the upstream pressure sensor 232 and the downstream pressure sensor 234, one can appreciate that a single sensor may be used instead, for example, a differential pressure sensor disposed to measure a difference in pressure between upstream and downstream locations relative to the direction of flow of exhaust gas through the after-treatment device 202.

In one embodiment, the DPF 206 includes a soot sensor 238. The soot sensor 238, if present, operates to provide a signal that is indicative of the amount of material that has accumulated in the DPF 206. In one embodiment, the soot sensor 238 emits radio frequency signals that pass through a filter element of the DPF 206 before being reflected back to the soot sensor 238 where they are received. The soot sensor 238 can provide a signal that is indicative of changes in amplitude between radio signals sent to the DPF 206 and radio signals received back from the DPF 206. In one embodiment, such changes in amplitude are correlated to an extent of soot loading of the DPF 206, such that an estimation of the amount of material having collected within the DPF 206 can be determined by, for example, logic integrated in the soot sensor 238 or logic present within the controller 222.

In the embodiment of FIG. 2, the controller 222 is further connected to other machine systems 240, which are represented collectively as a single block in FIG. 2. Communication of information and command signals between the controller 222 and the other machine systems can be accomplished by any appropriate method. In one embodiment, a multi-channel CAN link 242 provides appropriate channels of communication between the controller 222 and each of the other machine systems 240. Such other machine systems can include any component or system of the machine that provides functional information during operation of the machine. Examples of such systems include a neutral switch, which provides information about a transmission or traction system of the machine, a parking brake switch, which provides information about the engagement state of a parking and/or emergency brake, a throttle setting switch, which provides information indicative of the extent of throttle engagement of the engine 204, an implement lockout engagement switch, an operator presence switch, and others. One can appreciate that different systems, and thus different information about such systems, may be available depending on the type of machine or vehicle involved.

An operator interface 244 is communicatively connected to the controller 222 and arranged to provide visual and/or audio information signals to an operator of the machine. Of course, such interface is optional and may include one or more operator controls, such as a manual enable or disable switch. The operator interface 244 may include a display for displaying information relative to the operational status of the after-treatment system 200. The operator interface 244 may be a standalone or dedicated interface for displaying information and receiving commands relative to the after-treatment system 200 alone, for example, when such system is retrofitted to an existing machine, or may be integrated with a multi-functional or multi-purpose display that is arranged to interface with other systems of the machine.

Figure 3:
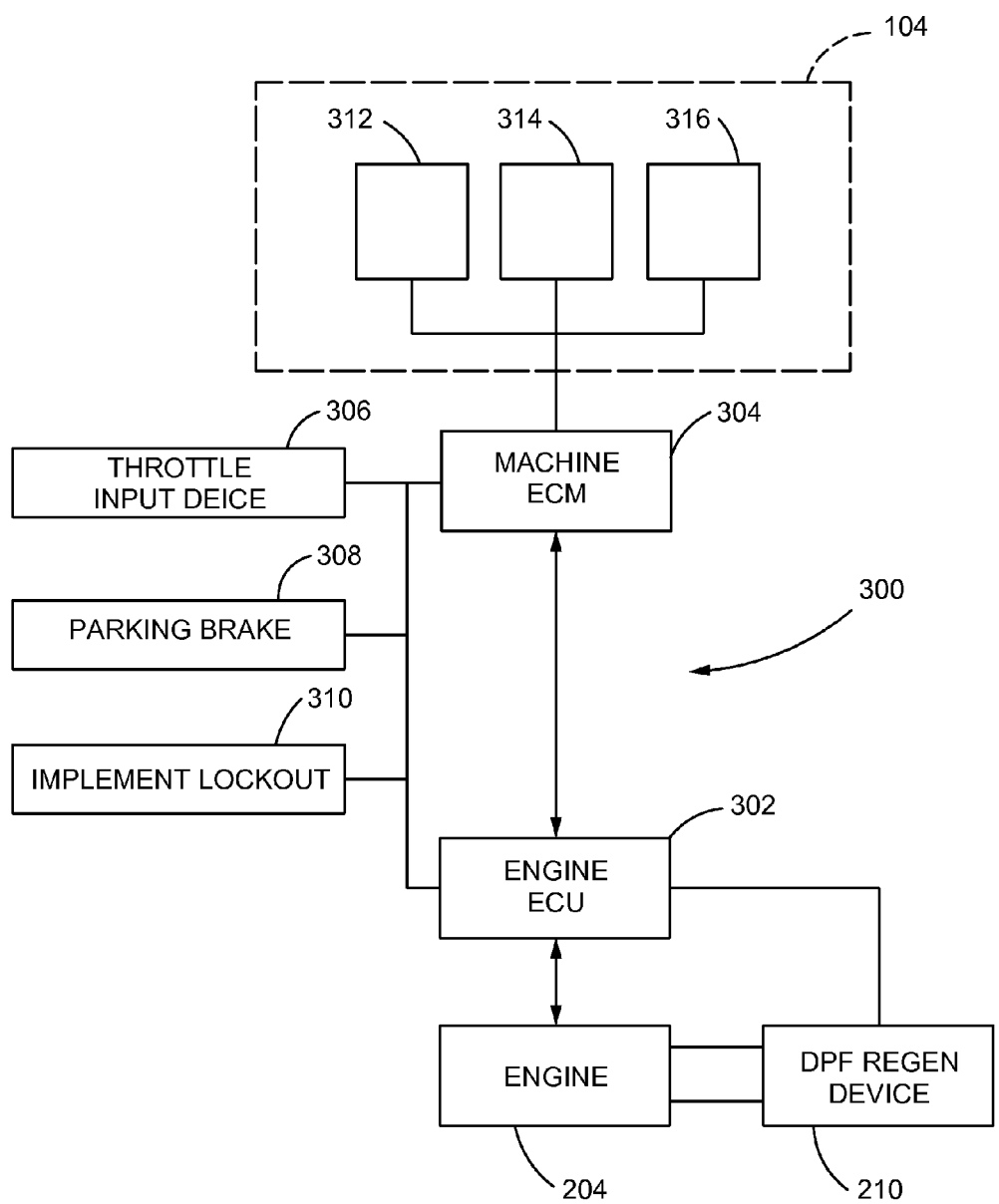
FIG. 3 is a block diagram of an exemplary controller and related inputs that may be provided on the machine of FIG. 1.

A block diagram of an exemplary controller 300 provided on the machine is shown in FIG. 3. The controller 300 may include an engine electronic control unit (ECU) 302 operably coupled to the engine 204 and the DPF regeneration device 210. The engine ECU 302 may be configured to monitor various operating parameters of the machine and generate an engine command signal representing a desired engine speed.

Additionally, the engine ECU 302 may control operation of the DPF regeneration device 210. The engine ECU 302 may use various parameters, such as DPF soot level, machine operating time, and machine operating load, to determine when a regeneration event is needed and/or the type of regeneration event to employ. For example, the engine ECU 302 may generate a DPF regeneration level that is indicative of the urgency with which a regeneration event is needed. The regeneration level may be indicated by a number from 0 to 5, in which: a level of 0 may indicate that the DPF filter is sufficiently operative and does not require regeneration; a level of 1 may indicate that an active level of regeneration is needed; a level of 2 may indicate that a level 1 condition has been present for a period of time and an active level of regeneration is still needed; a level of 3 may indicate that a parked regeneration is now needed; a level of 4 may indicate that a service tool level of regeneration is needed; and a level of 5 may indicate that a critical problem has occurred. Additionally, the engine ECU 302 may generate a DPF regeneration status which indicates the operative mode of the DPF regeneration device 210. Accordingly, the DPF regeneration status may be inactive (level 0), executing an active regeneration (level 1), or executing a parked regeneration (level 2). Still further, the engine ECU 302 may generate a manual regeneration request status which indicates whether a service tool has requested a manual regeneration event. The manual regeneration request status may be represented by a value of 0, indicating that no request has been made, or 1, indicating that the service tool has been used to request a manual regeneration of the DPF.

The controller 300 may further include a machine electronic control module (ECM) 304 communicatively coupled to the engine ECU 302. Various inputs may be communicatively coupled to the ECU 302 and ECM 304. For example, a throttle input device 306 is operatively coupled to the ECU 302 and/or ECM 304 that is operable between 0-100% of a maximum throttle level. The throttle input device 306, or a throttle input sensor (not shown), may detect a position of the throttle input device and generate a throttle input signal indicative of the state of the throttle input device 306.

The machine may further include a parking brake 308 movable between an on position, in which the machine is prevented from moving, and an off position, in which the machine is permitted to travel. The parking brake 308, or a parking brake sensor (not shown), may detect a position of the parking brake 308 and communicate a parking brake signal to the ECU 302 and/or ECM 304.

Additionally, the machine may include an implement lockout 310 that can be used to selectively disable operation of the implement. The implement lockout 310 is movable between an on position, in which operation of the implement is disabled, and an off position, in which operation of the implement is permitted. The implement lockout 310 may be provided as a switch which provides an implement lockout signal indicative of the implement lockout state to the ECU 302 and/or ECM 304.

Indicators may be provided in the operator compartment 104 to provide visual feedback to the operator regarding the status of the DPF system and/or the need for a regeneration. For example, a DPF indicator 312 may be provided for indicating that machine operation should be adjusted to permit a proper regeneration. Additionally, an engine indicator 314 may be provided for indicating that the engine system has a fault. The engine indicator 314 may include a secondary color, such as yellow, to indicate a lower level fault and a primary color, such as red, to indicate a higher level fault. Still further, an operator alert indicator 316 may be provided to indicate that a DPF regeneration related action is imminent or needed. The operator alert indicator 316 may have a continuous mode for indicating a lower level alert and an intermittent or flashing mode for indicating a higher level alert.

INDUSTRIAL APPLICABILITY

An exemplary control strategy is illustrated in the flowcharts of FIGS. 4-9. The flowcharts illustrate one embodiment of a control strategy for determining when a DPF regeneration is needed and automatically controlling the engine 204 to permit such a DPF regeneration to be performed. Such control strategy may be implemented in the form of computer executable instructions that reside in a computer readable or accessible medium that is integrated with a logic device in a machine, such as an electronic controller.

Figure 4:
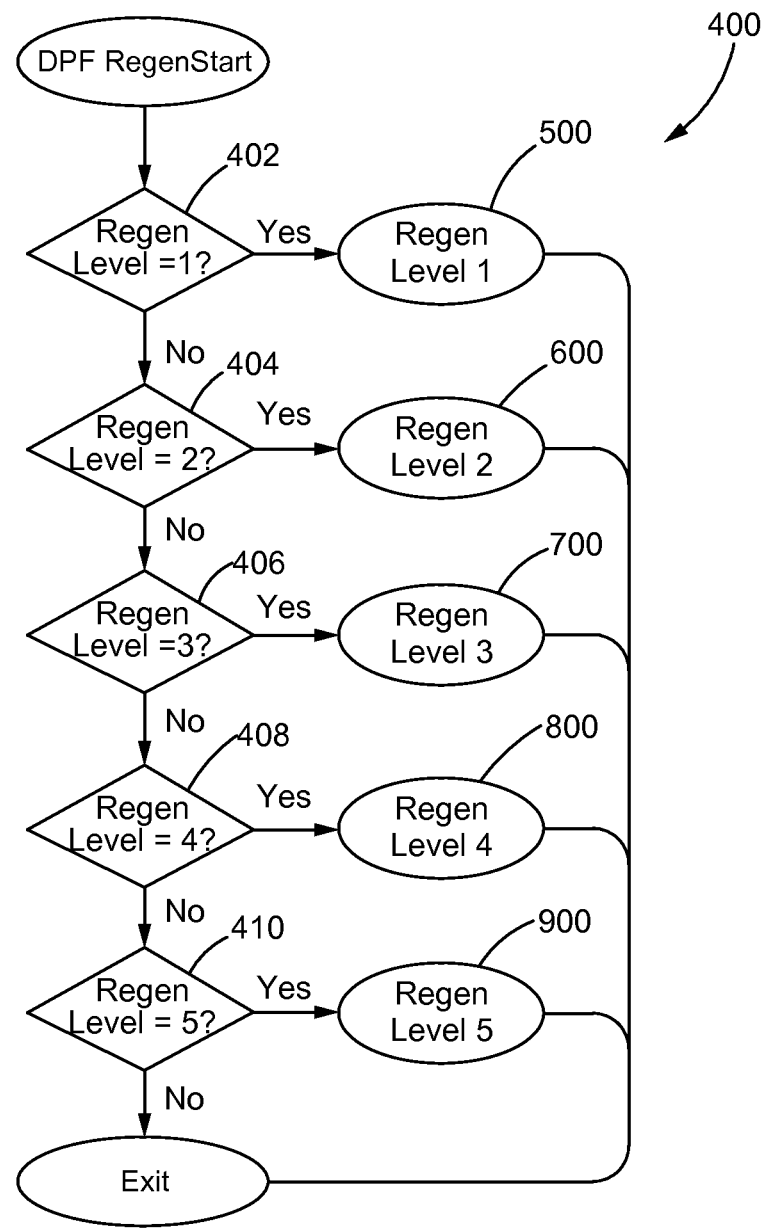
FIG. 4 is a flowchart of a method of automatically operating the engine to initiate a regeneration of a DPF according to the disclosure.

In the exemplary embodiment, FIG. 4 shows a flowchart of a routine 400 for determining the DPF regeneration level provided by the engine ECU 302. The machine ECM 304 may receive a signal from the engine ECU 302 providing an indication of the DPF regeneration level, which may be based on information provided by one of the sensors associated with the DPF 206. In the embodiments disclosed herein, the regeneration may be a value from zero to five. A regeneration level of zero may indicate the DPF 206 does not require a regeneration, and may be the default to which the regeneration level is set after completion of a regeneration. While not shown in the figures, the ECM 304 may be programmed with a sub-routine to execute when the regeneration level is zero. For example, the ECM 304 may either immediately or gradually return the engine throttle level back to the operator setting, clear any timers, and generally reset the regeneration routine 400.

Figure 5:
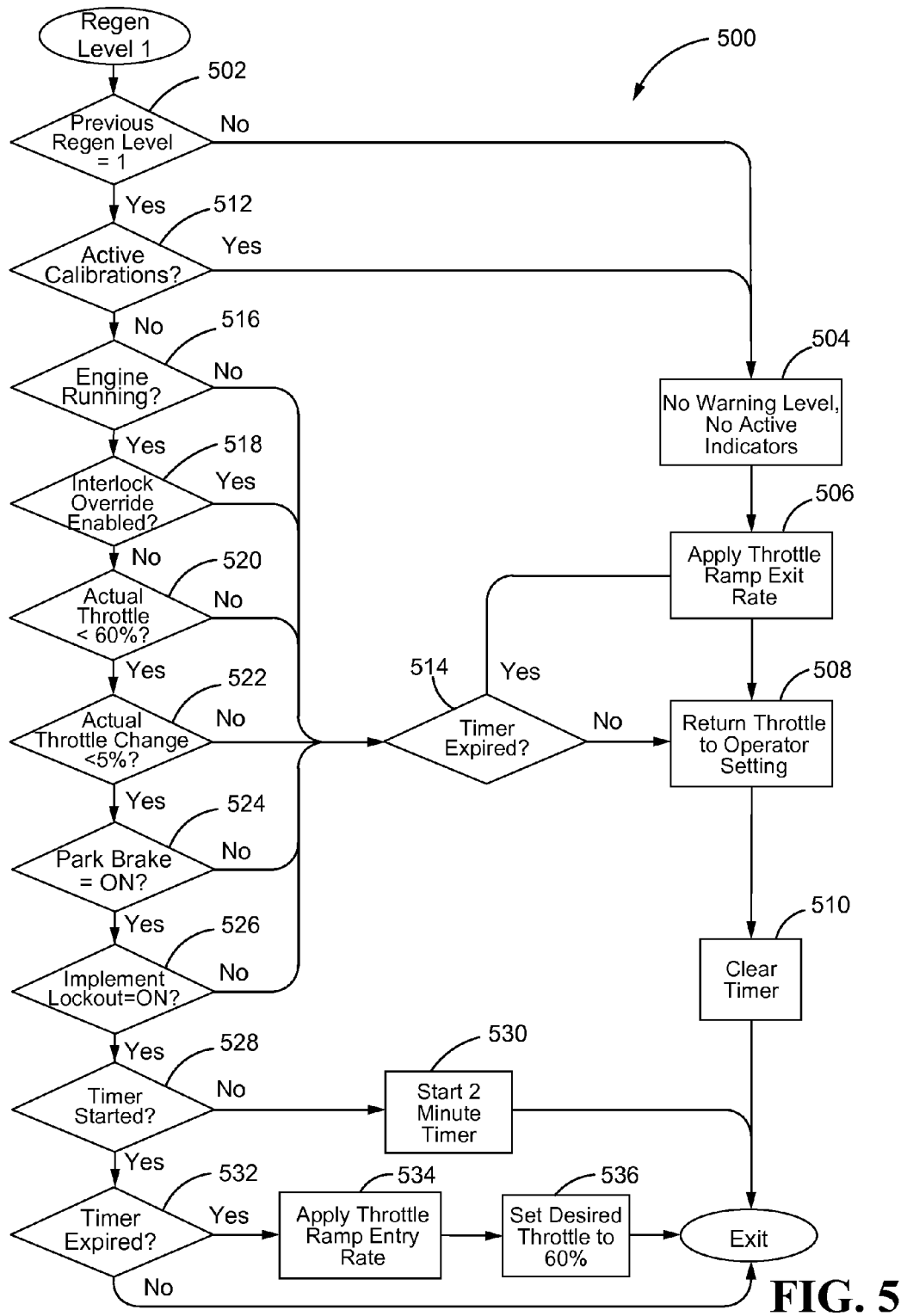
FIG. 5 is a flowchart of a method of automatically operating the engine in response to a first regeneration level.
Figure 6:
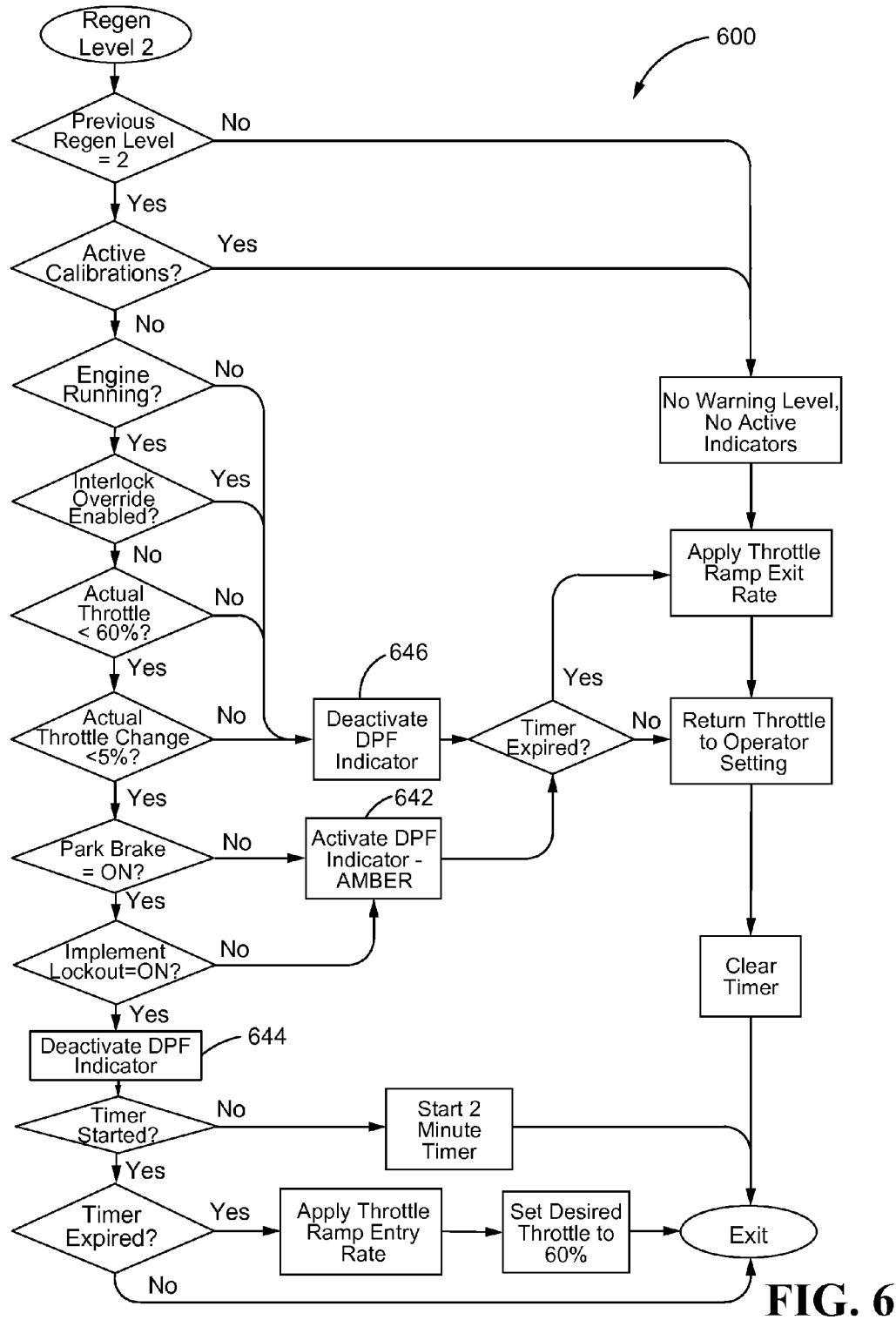
FIG. 6 is a flowchart of a method of automatically operating the engine in response to a second regeneration level.
Figure 7:
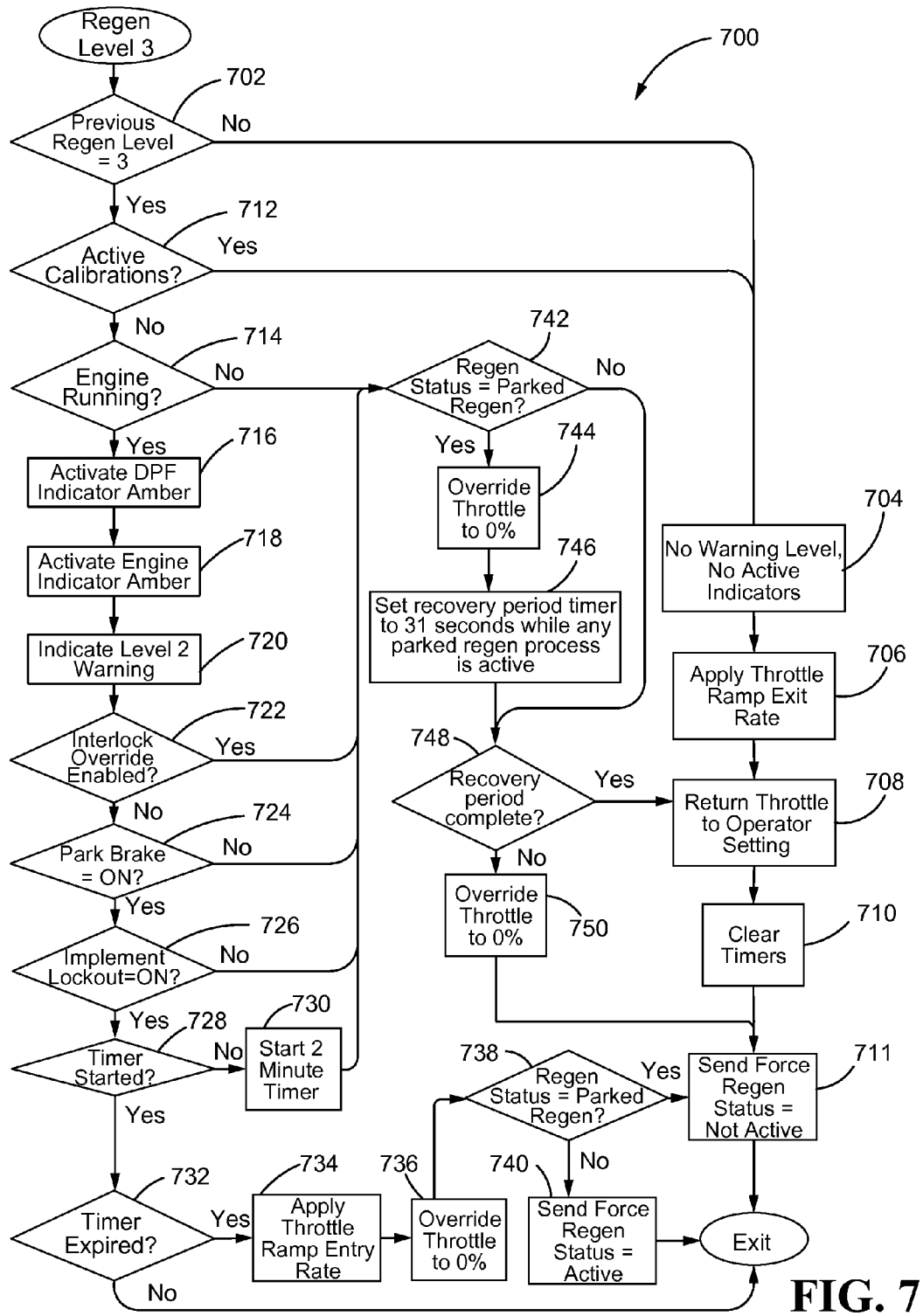
FIG. 7 is a flowchart of a method of automatically operating the engine in response to a third regeneration level.
Figure 8:
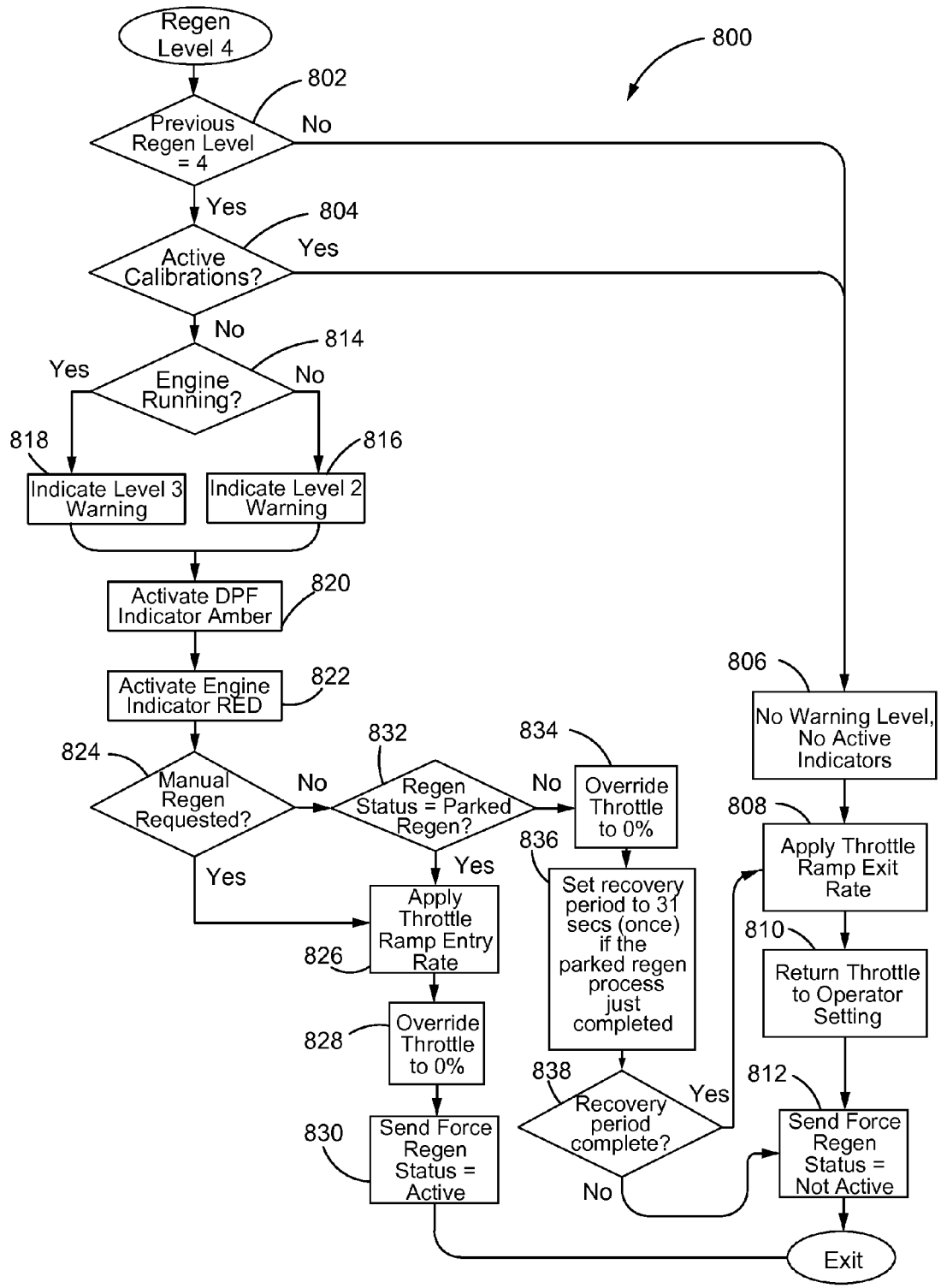
FIG. 8 is a flowchart of a method of automatically operating the engine in response to a fourth regeneration level.
Figure 9:
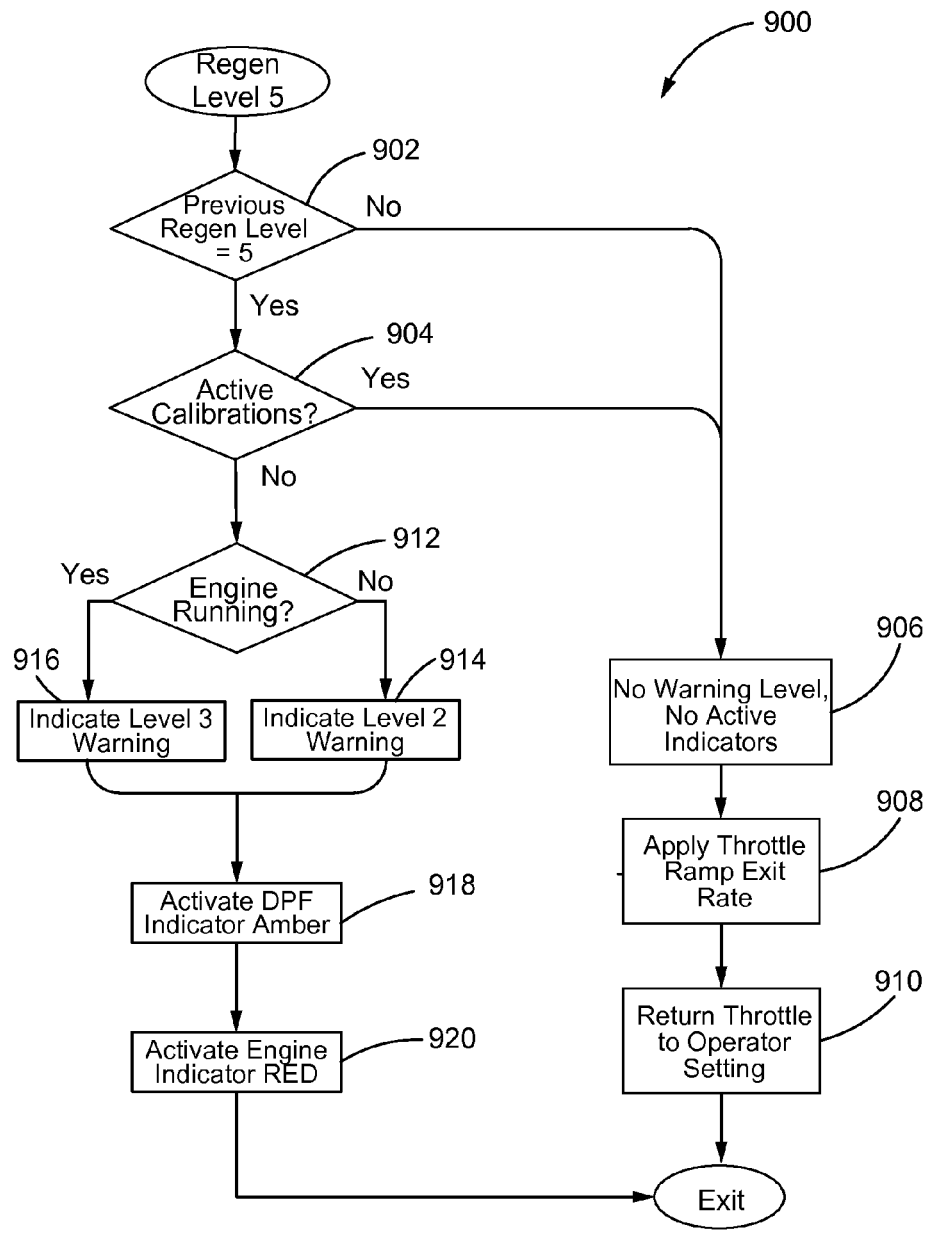
FIG. 9 is a flowchart of a method of automatically operating the engine in response to a fifth regeneration level.

Referring to FIG. 4, at block 402, the ECM 304 determines if the DPF regeneration level is equal to level one, in which case the level one regeneration sub-routine 500 is executed (FIG. 5). If not, the ECM 304 determines whether the DPF regeneration level is equal to level two at block 404, in which case the level two regeneration sub-routine 600 is executed (FIG. 6). Next, the routine 400 determines if the DPF regeneration level is equal to level three at block 406, in which case the level three regeneration sub-routine 700 is executed (FIG. 7). At block 408, the routine 400 may then determine if the DPF regeneration level is equal to level four, in which case the level four regeneration sub-routine 800 is executed (FIG. 8). Finally, the routine 400 may progress to block 410 to determine if the DPF regeneration level is equal to level five, in which case the level five regeneration sub-routine 900 is executed (FIG. 9). If the DPF regeneration level is not equal to any of 1 through 5, then either the DPF does not require regeneration or the machine is operating at a level sufficient to perform a passive regeneration, and therefore the ECM 304 will exit the routine 400. Additionally, the ECM may exit the routine 400 when any one of the level one through five regeneration sub-routines 500, 600, 700, 800, and 900 is complete.

The level one regeneration sub-routine 500 is illustrated in the flowchart of FIG. 5. The level one regeneration sub-routine may be used when operating conditions indicate that an active regeneration event may be used. This may be the case when the DPF 206 has trapped a relatively low amount of material, and therefore while regeneration may be advantageous, the failure to regenerate the DPF will not significantly impact machine operation. Under a level one regeneration condition, the controller may identify when the machine is in an idle condition, and then automatically override the throttle input to drive the engine at a speed sufficient to carry out a regeneration. Accordingly, the level one regeneration condition may be the first level of response to an indication that DPF regeneration is needed.

More specifically, the level one regeneration sub-routine 500 may begin at block 502 by determining whether the previous regeneration level determined by the ECM 304 was equal to level one. If the previous regeneration level was not equal to one, the sub-routine 500 proceeds to switch or maintain any warning levels and active indicators in the off condition at block 504, apply a throttle ramp exit rate at block 506, return the throttle to the operator setting at block 508, clear the timer at block 510, and exit the subroutine 500. Alternatively, if the previously determined regeneration level was equal to one, the sub-routine 500 will proceed to determine whether any active calibrations are taking place on the machine at block 512. Calibrations may be conducted to determine parameters associated with machine or auxiliary systems, such as determining implement position and range of motion. Different calibration procedures may require the engine 204 to operate at various specific speeds, and therefore altering engine speed control to perform a regeneration may prevent a calibration procedure from being conducted properly and accurately. Accordingly, if an active calibration is in progress, the sub-routine 500 will advance through blocks 504, 506, 508, and 510 to exit the sub-routine 500.

If no active calibration is taking place, the sub-routine 500 will proceed to determine whether one or more operating conditions are present to permit an active regeneration to take place. In the illustrated embodiment, the sub-routine 500 determines six operating conditions that permit an active regeneration to proceed. If any of these six operating conditions are not met, the sub-routine 500 will proceed to block 514 to determine if the timer has expired. If the timer is expired, indicating that a regeneration may be in progress, the sub-routine will apply the throttle ramp exit rate at block 506, and proceed through blocks 508 and 510 to exit the sub-routine. The throttle ramp exit rate may be approximately 1-8,000 RPM/sec. In an exemplary embodiment, the throttle ramp exit rate may be approximately 50-5,000 RPM/sec. In a further embodiment, the throttle ramp exit rate is approximately 180 RPM/sec. The sub-routine 500 may continue to change the engine command setting at the throttle ramp exit rate until it returns to the throttle input setting level at block 508. If instead the timer is not expired at block 514, which may indicate that a regeneration has not been started, the sub-routine 500 will return the throttle to the operating setting at block 508, clear the timer at 510, and exit the sub-routine 500.

One of the operating conditions determined in the sub-routine 500 may be to determine whether the engine is running at block 516. If the engine is not running, the sub-routine 500 will proceed to block 514 and ultimately exit the sub-routine 500 as described above. Alternatively, if the engine is running, the sub-routine 500 may proceed to determine whether another operating condition is met.

The sub-routine 500 may further determine whether an interlock override is enabled at block 518. Some machines may be provided with a safety feature in the form of an interlock system, which will automatically disable the engine and/or components of the machine when the operator leaves the seat or cab area of the machine. An interlock override may be provided on the machine to permit an operator to selectively disable the interlock system to allow the operator to perform a task with the machine while unseated. For example, an implement attached to the machine may require direct or manual manipulation by the operator, in which case the operator may need to exit the cab. If an interlock override is enabled, the operator may be performing a task that requires a specific engine speed, and therefore it would be undesirable to override the operator throttle setting during that task. Accordingly, if an interlock override is enabled, the sub-routine 500 may be configured to proceed to block 514 and ultimately exit the sub-routine 500 as described above. Alternatively, if the interlock override is not enabled, the sub-routine 500 may proceed to determine whether an additional operating condition is met.

The sub-routine 500 may also determine at block 520 whether the throttle input setting from the throttle input device 306 is less than a throttle regeneration threshold. The throttle regeneration threshold may be selected to represent an engine speed that is expected to generate operating conditions in the DPF that are sufficient for a regeneration event. The throttle regeneration threshold may be stated as a percentage of the maximum throttle level, such as approximately 40-70% of the maximum throttle level. In some applications, it has been found that a throttle regeneration threshold of approximately 60% of maximum throttle may be used, which may generate an engine speed of approximately 2,000 rpm for some machines.

If the throttle input setting is above the throttle regeneration threshold, then machine conditions may be sufficient to permit passive regeneration and automatic control is not needed, and therefore the sub-routine 500 will may proceed to block 514 and exit the sub-routine 500 as described above. If, however, the throttle input setting is below the throttle regeneration threshold, then passive regeneration will not occur and the level one regeneration sub-routine 500 will proceed to determine if the operating conditions of the machine will safely permit overriding the throttle input setting to initiate an active regeneration.

In general, when determining whether an active regeneration may be used, the sub-routine 500 may determine whether the machine is in an idle state. Specifically, the sub-routine 500 may be configured to determine that an idle state is present by determining whether the machine is operating with at least one idle parameter that is indicative of an idle state. Such idle parameters may include an engaged parking brake, an engaged implement lockout, a throttle input setting remaining below a throttle regeneration threshold, a throttle input setting remaining below a threshold throttle tolerance, an engine speed remaining below an engine speed threshold, a machine ground speed remaining below a ground speed threshold, a transmission setting having a neutral position, an implement status of non-active, or other parameters that indicate that the machine is idle. In the exemplary embodiment, the sub-routine 500 applies a hysteresis factor to prevent repeated entry into and exit from the level one regeneration mode. For example, the sub-routine 500 may determine whether the throttle input setting deviates by more than a threshold throttle tolerance at block 522. The threshold throttle tolerance may be set at approximately 1-50% of the initial throttle input setting. In certain embodiments, the threshold throttle tolerance may be approximately 5%. An idle state may further be identified by determining whether the parking brake is on at block 524 and determining whether the implement lockout is on at block 526.

If each of the operating conditions is in the appropriate state, the sub-routine 500 may further predicate an idle state on whether the at least one idle parameter remains present for a threshold idle time period. For example, the sub-routine 500 may determine if a timer has been started at block 528. If the timer has not been started, then the sub-routine starts a timer at block 530 and exits the sub-routine 500. If, however, the timer has been started, then the sub-routine 500 may determine whether the timer has expired at block 532. The timer may be set at the threshold idle time period, such as within the range of approximately 0-1000 seconds. In the exemplary embodiment, the threshold idle time period is approximately 120 seconds.

If the timer has not expired at block 532, the timer continues to run and the rub-routine proceeds to exit and return to the main routine 400. Alternatively, if the timer has expired at block 532, which indicates that the at least one idle parameter has been present for the threshold idle time period, then the sub-routine 500 may override the throttle input setting and drive the engine command setting to a predetermined throttle regeneration setting. More specifically, in the sub-routine 500, the engine command setting may be increased by a throttle ramp entry rate at block 534. The throttle ramp entry rate may be approximately 1-8,000 RPM/sec. In an exemplary embodiment, the throttle ramp entry rate may be approximately 50-5,000 RPM/sec. In a further embodiment, the throttle ramp entry rate is approximately 180 RPM/sec. While the throttle ramp entry rates disclosed herein have similar values to the throttle ramp exit rates disclosed above, it should be appreciated that the throttle ramp entry rate may be determined independently of the throttle ramp exit rate, and they need not be the same or similar values. At block 536, a predetermined throttle regeneration setting is determined. The predetermined throttle regeneration setting is selected to provide an engine speed that generates favorable conditions for conducting a regeneration event. It may be stated as a percentage of the maximum throttle level, such as approximately 40-70% of the maximum throttle level. In some applications, it has been found that a predetermined throttle regeneration setting of approximately 60% of maximum throttle may be used, which may generate an engine speed of approximately 2,000 rpm for some machines. With the predetermined throttle regeneration setting determined, the sub-routine 500 may exit back to the main routine 400.

The level two regeneration sub-routine 600 is illustrated in the flowchart of FIG. 6. The level two regeneration sub-routine 600 may be used when operating conditions indicate that an active regeneration event may still be used, but a level one condition has persisted for a predetermined period of time and therefore an escalated response may be desired. For example, if the DPF regeneration level has remained at level 1 for a period of time, such as approximately 30 minutes, without a DPF regeneration being performed, then the DPF regeneration level may be set to 2. The level two regeneration sub-routine 600 is nearly identical to the level one regeneration sub-routine 500 shown in FIG. 5, and therefore only the differences will be discussed in detail.

Specifically, the level two regeneration sub-routine 600 may include activating the DPF indicator 312 at block 642 in response to some of the operating conditions being in the proper condition, but either the parking brake or implement lockout is off and therefore a regeneration will not occur. By activating the DPF indicator 312, the operator is alerted that an active regeneration is desired but that the current operating conditions are not conducive to an active regeneration event (i.e., the machine is not in an idle state). Accordingly, the operator may be trained to alter the operating conditions of the machine, such as by altering the throttle input setting, parking brake setting, implement lockout setting, or other machine setting, to induce either a passive or an active regeneration. The sub-routine 600 also includes deactivating the DPF indicator at block 644 when all of the operating conditions are met, and therefore an active regeneration has been or will be initiated. The sub-routine 600 further may include deactivating the DPF indicator 312 at block 646 if the engine is not running, the interlock override is enabled, the actual throttle is not below threshold, or the throttle input setting deviates by more than a threshold throttle tolerance. Otherwise, the level two regeneration sub-routine 600 is substantially identical to the level one regeneration sub-routine 500.

Different types of logic may be associated with activating the DPF indicator 312 at block 642. As noted above, illumination of the DPF indicator 312 may be used as a training tool, whereby the operator is taught to modify some aspect of machine operation (i.e., throttle input setting, parking brake setting, implement lockout setting, or other machine setting) in response to activation of the DPF indicator 312, thereby to provide machine operation parameters that are sufficient to permit passive or active regeneration. In the embodiment of FIG. 6, one of the factors for determining whether to activate the DPF indicator 312 at block 642 is whether the throttle is greater than 60%. In some machines, changes in throttle level may be relatively gradual, and therefore the sub-routine 600 may only check whether the instantaneous throttle level is greater than 60%. In other machines, the throttle level may change more rapidly so that the threshold throttle level is frequently crossed. Using an instantaneous determination of throttle level in these machines may cause the DPF indicator 312 to rapidly activate and deactivate, thereby detracting from the effectiveness of the DPF indicator 312 as a training tool. For these other machines, therefore, a different DPF indicator logic may be used, such as setting a timer to measure an accumulated amount of time when the throttle is below the throttle level threshold, and activating the DPF indicator 312 at block 642 only when the accumulated low throttle time meets a low throttle time threshold, such as approximately 15 minutes. When this alternative logic is used, the DPF indicator 312 may be latched in an activated condition to prevent subsequent throttle fluctuations from deactivating the DPF indicator 312. Instead, the DPF indicator 312 will be deactivated only after an active or passive regeneration has been performed.

The level three regeneration sub-routine 700 is illustrated in the flowchart of FIG. 7. The level three regeneration sub-routine 700 may be used when the DPF 206 becomes sufficiently loaded with soot or other material that an active regeneration event is no longer sufficient but instead a parked regeneration event is required to return the DPF 206 to proper operating condition. Such a condition may be determined directly by a sensor, or may be inferred based on the operating history of the machine. For example, if a DPF regeneration level of 2 has been present and machine operation continues for a predetermined amount of time, the DPF regeneration level may be set to 3. The predetermined amount of time may be 2 hours at high idle, 3 hours at a 25% load, or some other combination of time and magnitude of machine operation. In such circumstances, there may be an elevated need for a DPF regeneration, and that regeneration may need to be a parked regeneration, which may remove relatively more material from the DPF 206, as opposed to an active regeneration, which may remove relatively less material from the DPF 206.

Certain features of the level three regeneration sub-routine 700 may be similar to the sub-routines 500, 600 discussed above. For example, the level three regeneration sub-routine 700 may include determining at block 702 whether the previous regeneration level determined by the ECM 304 was equal to level three. If the previous regeneration level was not equal to one, the sub-routine 700 proceeds to switch or maintain any warning levels and active indicators in the off condition at block 704, apply a throttle ramp exit rate at block 706, return the throttle to the operator setting at block 708, clear the timer at block 710, set the forced regeneration status to not active at block 711, and exit the subroutine 700.

Alternatively, if the previously determined regeneration level was equal to three, the sub-routine 700 will proceed to determine whether any active calibrations are taking place on the machine at block 712. If an active calibration is in progress, the sub-routine 700 will advance through blocks 704, 706, 708, 710, and 711 to exit the sub-routine 700. If no active calibration is taking place, the sub-routine 700 may proceed to determine whether one or more operating conditions are present to permit a parked regeneration to take place.

In the illustrated embodiment, the sub-routine 700 may determine four operating conditions that permit a parked regeneration to proceed. For example, the sub-routine 700 may determine whether the engine is running at block 714. If the engine is running, the sub-routine 700 may activate the DPF indicator 312 at block 716 to indicate that a DPF regeneration is needed, activate the engine indicator 314 at block 718 to indicate an engine fault condition, and illuminate the operator indicator 316 with a Level 2 warning at block 720 to alert the operator to the immediate need for attention to the DPF system. Since a parked regeneration may still be used, the engine indicator 314 may be illuminated with the secondary color (yellow) to indicate a low level fault.

After illuminating the indicators, the sub-routine 700 may check to ensure that the machine operating conditions are suitable for initiating a parked regeneration. For example, the sub-routine may determine whether the interlock override is enabled at block 722, whether the parking brake is on at block 724, and whether the implement lockout is on at block 726. If the engine is running, the interlock override is disabled, the parking brake is on, and the implement lockout is on, the machine will meet the conditions for performing a parked regeneration and the sub-routine may proceed to block 728 to determine whether a timer was started. If the timer was not started, the sub-routine will start the timer at block 730.

Alternatively, if the timer was started, the sub-routine may proceed to determine whether the timer has expired at block 732. If the timer has expired, then the engine command setting is decreased by the throttle ramp entry rate at block 734. At block 736, the override of the throttle input setting is continued until the command setting is approximately 0%. The engine command setting is decreased to approximately 0% because a parked regeneration event typically requires this condition before initiating, in contrast to an active regeneration event which requires an increase in the engine command setting. Once the engine command setting reaches approximately 0%, the engine ECU 302 is capable of operating the engine 204 as needed to execute the parked regeneration event. At block 738, the sub-routine 700 checks whether the regeneration status is equal to the parked regeneration mode. If not, the machine ECM 304 will signal that the forced regeneration status is active at block 740 and exit the sub-routine 700. Otherwise, if the regeneration status is equal to the parked regeneration mode, then the ECM 304 will set the forced regeneration status to not active at block 711 and exit the sub-routine 700.

If any of the four operating conditions identified in blocks 714, 722, 724, and 726 are not met, or if the timer was not previously started at block 728, the sub-routine 700 may proceed to block 742 to determine if the regeneration status is equal to the parked regeneration mode. If any parked regeneration process is active, the sub-routine 700 will override the throttle to 0% at block 744 and set a recovery period timer. The recovery period timer may be set at a period that exceeds a recovery rate of the engine ECU 302 as it exits the parked regeneration event, such as approximately 31 seconds.

If either the regeneration status is not equal to a parked regeneration at block 742, or the recovery period has been set at block 746, the sub-routine 700 may proceed to block 748 to determine if the recovery period is complete. If the recovery period is complete, the sub-routine 700 proceeds to apply the throttle ramp exit rate (block 706), return the throttle to the operator setting (block 708), clear the timers (block 710), set the force regeneration status as not active (block 711), and exit the sub-routine 700. Alternatively, if the recovery period is not complete at block 748, the sub-routine 700 will override the throttle to 0% at block 750, set the force regeneration status as not active (block 711), and exit the sub-routine 700.

The level four regeneration sub-routine 800 is illustrated in the flowchart of FIG. 8. The level four regeneration sub-routine 800 may be used when a parked regeneration is no longer sufficient, but instead a service tool regeneration is needed to return the DPF to proper operating condition. Regeneration level 4 may be determined based on feedback from one or more sensors, or may be inferred from machine operation history. For example, regeneration level 4 may be determined when a regeneration level of 3 has persisted for a period of time without a regeneration being performed. The period of time may be dependent on the magnitude of machine operation, such as 1 hour at high idle or 1.5 hours at a 25% load.

Certain features of the level four regeneration sub-routine 800 may be similar to the sub-routines 500, 600, and 700 discussed above. For example, the level four regeneration sub-routine 800 may include determining at block 802 whether the previous regeneration level determined by the ECM 304 was equal to level four and determining at block 804 if any active level calibrations are taking place. If the previous regeneration level was not equal to level four, or if an active calibration is taking place, the sub-routine 800 proceeds to switch or maintain any warning levels and active indicators in the off condition at block 806, apply a throttle ramp exit rate at block 808, return the throttle to the operator setting at block 810, set the force regeneration status as inactive at block 812, and exit the subroutine 800.

If the previous regeneration level was equal to level four and no active calibration is taking place, the sub-routine 800 may proceed to determine whether the engine is running at block 814. If the engine is not running, the sub-routine 800 may proceed to block 816 to indicate a level two warning. Alternatively, if the engine is running, the sub-routine 800 may proceed to block 818 to indicate a level three warning. In either event, the sub-routine then activates the DPF indicator 312 to amber (thereby to indicate that a regeneration is needed) at block 820 and activates the engine indicator 314 (thereby to indicate an engine fault condition) at block 822. Since a service tool regeneration is now required, the engine indicator 314 may be illuminated with the primary color (red) to indicate a high level fault. The operator indicator 316 may be illuminated intermittently at block 820 to alert the operator to the immediate need for attention to the DPF system. After illuminating the indicators, the sub-routine 800 then determines if a manual regeneration request status is on at block 824.

If a manual regeneration request has been received, then the engine command setting is adjusted by the throttle ramp entry rate at block 826. At block 828, the override of the throttle input setting is continued until the command setting is approximately 0%. The engine command setting is decreased to approximately 0% because a service tool regeneration event typically requires this condition before initiating. Once the engine command setting reaches approximately 0%, the engine ECU 302 will operate the engine 204 as needed to execute the service tool regeneration event. At block 830, the forced regeneration status is set to active and the sub-routine is exited.

If a manual regeneration request was not received at block 824, the sub-routine 800 may proceed to block 832 to determine whether the regeneration status is equal to a parked regeneration. If the regeneration status is equal to a parked regeneration, then the sub-routine proceeds to apply the throttle ramp entry rate at block 826, override the throttle to 0% at block 828, set the forced regeneration status to active at block 830, and exit the sub-routine 800 as described above. Alternatively, if the regeneration status is not equal to a parked regeneration, then the sub-routine may override the throttle to 0% at block 834. At block 836, the sub-routine 800 may set a recovery period if a parked regeneration process has just completed. The recovery period may be set once for a period, such as 31 seconds, that is sufficient to permit the engine and controls to return to relatively normal operating conditions after performing the service tool regeneration event. At block 838, the sub-routine 800 determines whether the recovery period is complete. If the recovery period is complete, the sub-routine may proceed to apply the throttle ramp exit rate at block 808, return the throttle to the operator setting at block 810, set the force regeneration status to inactive at block 812, and exit the sub-routine. If the recovery period is not complete, the sub-routine 800 may proceed to set the force regeneration status to inactive at block 812 and exit the sub-routine 800.

The level five regeneration sub-routine 900 is illustrated in the flowchart of FIG. 9. The level five regeneration sub-routine 900 may be used when a service tool regeneration is no longer sufficient, but instead a critical problem has occurred with the system that requires repair or replacement. Regeneration level 5 may be determined based on feedback from one or more sensors, or may be inferred from machine operation history. For example, regeneration level 5 may be determined when a regeneration level of 4 has persisted for a period of time without a regeneration being performed. The period of time may be dependent on the magnitude of machine operation, such as 1 hour at high idle or 1.5 hours at a 25% load.

The level five regeneration sub-routine 900 may include determining at block 902 whether the previous regeneration level determined by the ECM 304 was equal to level five and determining at block 904 if any active level calibrations are taking place. If the previous regeneration level was not equal to level four, or if an active calibration is taking place, the sub-routine 900 proceeds to switch or maintain any warning levels and active indicators in the off condition at block 906, apply a throttle ramp exit rate at block 908, return the throttle to the operator setting at block 910, and exit the subroutine 900.

If the previous regeneration level was equal to level five and no active calibration is taking place, the sub-routine 900 may proceed to determine whether the engine is running at block 912. If the engine is not running, the sub-routine 900 may proceed to block 914 to indicate a level two warning. Alternatively, if the engine is running, the sub-routine 900 may proceed to block 916 to indicate a level three warning. In either event, the sub-routine then activates the DPF indicator 312 to amber (thereby to indicate that a regeneration is needed) at block 918 and activates the engine indicator 314 (thereby to indicate an engine fault condition) at block 920. Since a critical problem has occurred, the engine indicator 314 may be illuminated with the primary color (red) to indicate a high level fault. The operator indicator 316 may be illuminated intermittently at block 918 to alert the operator to the immediate need for attention to the DPF system. After illuminating the indicators, the sub-routine 900 may exit.

A chart 1000 is provided in FIG. 10 summarizing the regeneration levels, operating conditions, indicator modes, warning levels, and override actions that may be used for a particular machine. The information provided on the chart 1000 may be specific to a type of machine, such as the skid steer loader 100. Chart 1100 provided in FIG. 11 provides an alternative summary of regeneration levels, operating conditions, indicator modes, warning levels, and override actions that may be used for an alternative machine, such as a compact wheel loader. The charts 1000, 1100 presented in FIGS. 10 and 11, respectively, are provided as examples and represent only two of the several embodiments currently contemplated by this disclosure.

It will be appreciated that the foregoing description provides examples of the disclosed system and technique for overriding a throttle input setting to a predetermined throttle regeneration setting to permit initiation of a DPF regeneration event. It is contemplated, however, that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. Moreover, all methods described herein can be performed in any suitable order unless otherwise indicated herein or otherwise clearly contradicted by context.

What is claimed is:

1. A method of automatically controlling an engine to override a throttle input setting and operate at a predetermined throttle regeneration setting sufficient to initiate a regeneration event for a diesel particulate filter associated with a machine and operably coupled to the engine, the engine including a controller configured to generate an engine command setting, the method comprising:
    determining a DPF regeneration level indicative of a need to regenerate the diesel particulate filter;
    determining whether the engine is in an idle state by determining that the throttle input setting remains below a throttle regeneration threshold, wherein the throttle regeneration threshold is 40-70% of a maximum throttle level associated with the engine;
    operating the engine in a normal mode when the DPF regeneration level is below a regeneration level threshold, wherein the engine command setting in the normal mode is based on a throttle input setting; and
    operating the engine in an override mode when the DPF regeneration level is above a regeneration level threshold and the engine is operating in the idle state, wherein the engine command setting in the override mode is based on the predetermined throttle regeneration setting.

2. The method of claim 1, in which the DPF regeneration level is based on at least one DPF operating parameter associated with the diesel particulate filter, wherein the at least one DPF operating parameter is selected from a group of DPF operating parameters including DPF soot level, machine operating time, and machine operating load.

3. The method of claim 1, in which determining the idle state further comprises determining that the at least one idle parameter is present for a threshold idle time period.

4. The method of claim 1, in which the predetermined throttle regeneration setting is 40-70% of a maximum throttle level associated with the engine when the DPF regeneration level is indicative of an active regeneration.

5. The method of claim 1, in which the predetermined throttle regeneration setting is 0% of a maximum throttle level associated with the engine when the DPF regeneration level is indicative of a manual regeneration.

6. The method of claim 1, in which operating the engine in the override mode further comprises changing the engine command setting at a throttle ramp entry rate until the engine command setting is at the predetermined throttle regeneration setting.

7. The method of claim 6, in which the throttle ramp entry rate is 50-5000 RPM/sec.

8. The method of claim 1, in which operating the engine in the override mode further comprises activating an alert indicator associated with the machine.

9. A machine comprising:
    an engine having an exhaust manifold;
    a diesel particulate filter fluidly connected to the exhaust manifold, the diesel particulate filter having a DPF regeneration level indicative of a need for regeneration;
    a DPF sensor configured to determine the DPF regeneration level;
    a throttle input device configured to generate a throttle input setting; and
    a controller operably coupled to the engine, the DPF sensor, and the throttle input device, the controller being configured to:
        determine an engine command setting;
        receive the DPF regeneration level;
        receive the throttle input setting;
        determine whether the engine is in an idle state by determining that the throttle input setting remains below a throttle regeneration threshold, wherein the throttle regeneration threshold is 40-70% of a maximum throttle level associated with the engine;
        operate the engine in a normal mode when the DPF regeneration level is below a regeneration level threshold, wherein the engine command setting in the normal mode is based on a throttle input setting; and
        operate the engine in an override mode when the DPF regeneration level is above a regeneration level threshold and the engine is operating in the idle state, wherein the engine command setting in the override mode is based on a predetermined throttle regeneration setting.

10. The machine of claim 9, in which the DPF sensor is configured to determine at least one DPF operating parameter associated with the diesel particulate filter, wherein the at least one DPF operating parameter is selected from a group of DPF operating parameters including DPF soot level, machine operating time, and machine operating load.

11. The machine of claim 9, in which the controller is further configured to determine the idle state by determining that the at least one idle parameter is present for a threshold idle time period.

12. The machine of claim 9, in which the predetermined throttle regeneration setting is 40-70% of a maximum throttle level associated with the engine when the DPF regeneration level is indicative of an active regeneration.

13. The machine of claim 9, in which the predetermined throttle regeneration setting is 0% of a maximum throttle level associated with the engine when the DPF regeneration level is indicative of an active regeneration.

14. The machine of claim 9, in which the controller, in the override mode, is further configured to change the engine command setting at a throttle ramp entry rate until the engine command setting is at the predetermined throttle regeneration setting.

15. The machine of claim 14, in which the throttle ramp entry rate is 50-5000 RPM/sec.

16. The machine of claim 9, in which the controller, in the override mode, is further configured to activate an alert indicator associated with the machine.

17. A method of automatically controlling an engine to override a throttle input setting and operate at a predetermined throttle regeneration setting sufficient to initiate a regeneration event for a diesel particulate filter associated with a machine and operably coupled to the engine, the engine including a controller configured to generate an engine command setting, the method comprising:

determining a DPF regeneration level indicative of a need to regenerate the diesel particulate filter;

determining whether the engine is in an idle state;

operating the engine in a normal mode when the DPF regeneration level is below a regeneration level threshold, wherein the engine command setting in the normal mode is based on a throttle input setting; and operating the engine in an override mode when the DPF regeneration level is above a regeneration level threshold and the engine is operating in the idle state, wherein the engine command setting in the override mode is based on the predetermined throttle regeneration setting, and in which the predetermined throttle regeneration setting is 40-70% of a maximum throttle level associated with the engine when the DPF regeneration level is indicative of an active regeneration.

\* \* \* \* \*